United States Patent
Naderer

(10) Patent No.: US 12,138,722 B2
(45) Date of Patent: Nov. 12, 2024

(54) EXTRACTION BY SUCTION SYSTEM FOR GRINDING TOOL WITH RADIAL DISC BRUSH

(71) Applicant: FerRobotics Compliant Robot Technology GmbH, Linz (AT)

(72) Inventor: Ronald Naderer, Oberneukirchen (AT)

(73) Assignee: FerRobotics Compliant Robot Technology GmbH, Linz (AT)

( * ) Notice: Subject to any disclaimer, the term of this patent is extended or adjusted under 35 U.S.C. 154(b) by 1246 days.

(21) Appl. No.: 16/756,579

(22) PCT Filed: Oct. 17, 2018

(86) PCT No.: PCT/EP2018/078461
§ 371 (c)(1),
(2) Date: Apr. 16, 2020

(87) PCT Pub. No.: WO2019/077007
PCT Pub. Date: Apr. 25, 2019

(65) Prior Publication Data
US 2020/0238463 A1    Jul. 30, 2020

(30) Foreign Application Priority Data

Oct. 18, 2017  (DE) ............ 10 2017 124 326.7

(51) Int. Cl.
*B23Q 11/00* (2006.01)
*A47L 7/00* (2006.01)
(Continued)

(52) U.S. Cl.
CPC .......... *B23Q 11/0046* (2013.01); *A47L 7/009* (2013.01); *A47L 7/0095* (2013.01);
(Continued)

(58) Field of Classification Search
CPC .... B24B 55/06–107; B24B 55/04–057; B24B 55/00; B24B 55/12; A47L 7/00;
(Continued)

(56) References Cited

U.S. PATENT DOCUMENTS

| 1,359,718 A | 11/1920 | McGuire |
| 2,394,556 A | 2/1946 | Martin |

(Continued)

FOREIGN PATENT DOCUMENTS

| AT | 399466 B | * | 4/1995 | ........... B23D 59/006 |
| AU | 399466 | * | 5/1995 | ........... B23D 59/006 |

(Continued)

OTHER PUBLICATIONS

Machine translation of AT399466 (Year: 1995).*
Machine translation of AT-399466-B (Year: 1995).*

*Primary Examiner* — Robert F Neibaur
(74) *Attorney, Agent, or Firm* — Murphy, Bilak & Homiller, PLLC

(57) ABSTRACT

The invention relates to an extraction device for a robot-assisted machine tool for surface processing. According to an exemplary embodiment, the extraction device comprises a housing with a vacuum nozzle and an outlet for connection of a hose. The extraction device also has a suspension that connects the housing to a mounting plate and is mounted on the mounting plate so as to be pivotable about an axis. A counterweight is connected to the suspension such that the counterweight substantially balances out the weight of the housing relative to the axis.

23 Claims, 4 Drawing Sheets

(51) Int. Cl.
*A47L 9/00* (2006.01)
*B24B 27/00* (2006.01)
*B24B 29/00* (2006.01)
*B24B 55/06* (2006.01)
*B25J 11/00* (2006.01)

(52) U.S. Cl.
CPC ........ *B24B 27/0038* (2013.01); *B24B 29/005* (2013.01); *B24B 55/06* (2013.01); *B25J 11/0065* (2013.01); *A47L 7/0085* (2013.01); *A47L 9/0072* (2013.01)

(58) Field of Classification Search
CPC .... A47L 7/0057; A47L 7/0071; A47L 7/0085; A47L 7/009; A47L 7/0095; B08B 5/04; B08B 15/02; B08B 15/002; B23Q 11/0046
USPC ....... 451/456, 453, 388, 178, 236, 451, 444, 451/340; 15/301, 323, 310, 351; 144/252.1
See application file for complete search history.

(56) References Cited

U.S. PATENT DOCUMENTS

| | | | | |
|---|---|---|---|---|
| 3,811,230 | A | * | 5/1974 | Beck .......................... B24B 9/16 451/281 |
| 4,596,060 | A | * | 6/1986 | Schmidt .................. B08B 15/04 15/301 |
| 4,875,398 | A | * | 10/1989 | Taylor .................. B23D 59/006 83/100 |
| 5,058,324 | A | * | 10/1991 | Snellen ..................... B24B 9/16 451/279 |
| 5,159,737 | A | * | 11/1992 | Kimura ................. B08B 15/002 15/312.1 |
| 2002/0133173 | A1 | | 9/2002 | Brock et al. |
| 2008/0311824 | A1 | | 12/2008 | Sarani |

FOREIGN PATENT DOCUMENTS

| | | |
|---|---|---|
| CN | 2133409 Y | 5/1993 |
| CN | 201287292 Y | 8/2009 |
| CN | 202318007 U | 7/2012 |
| CN | 103406817 A | 11/2013 |
| CN | 105479316 A | 4/2016 |
| CN | 206241818 U | 6/2017 |
| CN | 206305898 U | 7/2017 |
| DE | 4226681 A1 | 2/1994 |
| DE | 102013202332 A1 | 8/2014 |
| JP | S5142239 U | 3/1976 |
| JP | S6263043 A | 3/1987 |
| JP | H63-10921 | 3/1988 |
| JP | 02-048161 | 2/1990 |
| JP | H08-32378 | 12/1996 |
| JP | 2604961 B2 | 4/1997 |
| JP | 10-272622 | 10/1998 |
| JP | 2002239824 A | 8/2002 |
| JP | 2013244556 A | 12/2013 |
| WO | 2012154761 A1 | 11/2012 |

* cited by examiner

EXTRACTION BY SUCTION SYSTEM FOR GRINDING TOOL WITH RADIAL DISC BRUSH

TECHNICAL FIELD

The embodiments described here refer to an extraction device for a machine tool operated by a manipulator (e.g. an industrial robot) for the extraction of material removed from the surface of a work piece.

BACKGROUND

Surface machining processes such as, e.g. grinding and polishing processes that are carried out with the aid of robots are becoming increasingly prevalent in the processing of work pieces. Industrial robots are being employed in automated, robot-supporting manufacturing to automate, e.g. grinding processes.

In robot-supported processing apparatuses a machine tool with a rotating tool (such as, e.g. a grinding machine with a grinding disc or a radial bristle brush) is guided by a manipulator, for example, an industrial robot. During the machining process, the so-called TCP (tool center point) of the manipulator is moved along a defined trajectory which can be programmed in advance, e.g. by means of teach-in. The predefined trajectory of the TCP determines position and orientation of the TCP, and thus of the machine tool, for every point in time. For this purpose, the robot controller that controls the movement of the manipulator generally also performs position adjustment. Further, a spring or an additional actuator can be provided that presses the tool against the surface of the work piece with a predetermined force.

It is often necessary, or desired, to extract the material (e.g. grinding dust) removed from the surface of the work piece. For this purpose, the machine tool can be equipped with an extraction device that extracts the material removed from the surface of the work piece. Known extraction devices comprise an extractor hood that partially encloses the work piece. The extractor hood is connected to an extractor hose that generates a vacuum in the extractor hood, thereby extracting loose material. Extraction devices with extractor hoods are generally well known.

Smaller or narrower work pieces or work pieces with curved surfaces often make manipulating the extraction device difficult or it may simply be too big to be appropriately used on the work piece. Machining "upside down" (with the tool underneath the surface of the work piece) is also difficult for some extraction devices to accomplish.

The inventor has set himself the goal of providing an improved extraction device for robot-supported, surface-machining apparatuses.

SUMMARY

The aforementioned goal is achieved by means of the embodiments described below and discussed in more detail in the subsequent Detailed Description.

An extraction device for a robot-supported machine tool for the machining of surfaces is described. In accordance with one embodiment, the extraction device comprises a housing with a vacuum nozzle and an outlet for the connection of a hose. The extraction device further comprises a suspension that connects the housing to a mounting plate and which is mounted on the mounting plate pivotably around an axis. A counterweight is connected to the suspension such that the counterweight substantially balances out the weight of the housing relative to the axis. In one embodiment the suspension has a coupling quadrilateral.

In accordance with a further embodiment the extraction device comprises a housing with a vacuum nozzle and an outlet for the connection of a hose, as well as a suspension that connects the housing to a mounting plate and which is mounted on the mounting plate pivotably around at least one axis. A counterweight is connected to the suspension such that the weight of the housing produces a first torque around the axis and the counterweight produces a second torque that at least partially compensates the first torque.

Further, a device for the robot-supported machining of work piece surfaces is described. In accordance with one embodiment, the device comprises a support that is mountable on a manipulator, a machine tool with a rotating tool mechanically coupled to the support, as well as an extraction device pivotably mounted on a mounting plate, wherein the mounting plate is a part of the support.

BRIEF DESCRIPTION OF THE DRAWINGS

Various embodiments will now be described in greater detail based on the examples illustrated in the figures. The illustrations are not necessarily true to scale and the invention is not limited to the aspects illustrated here. Instead importance is attached to illustrating the underlying principles of the embodiments. With regard to the figures.

DETAILED DESCRIPTION

Before various embodiments will be discussed in detail, a general example of a robot-supported grinding device will be described. Although the embodiments described here are explained with reference to a grinding device, they are by no means limited to grinding devices and can be applied to any device intended for the abrasive machining of surfaces such as, for example, machine tools for milling, grinding, polishing, etc.

Figure 1:
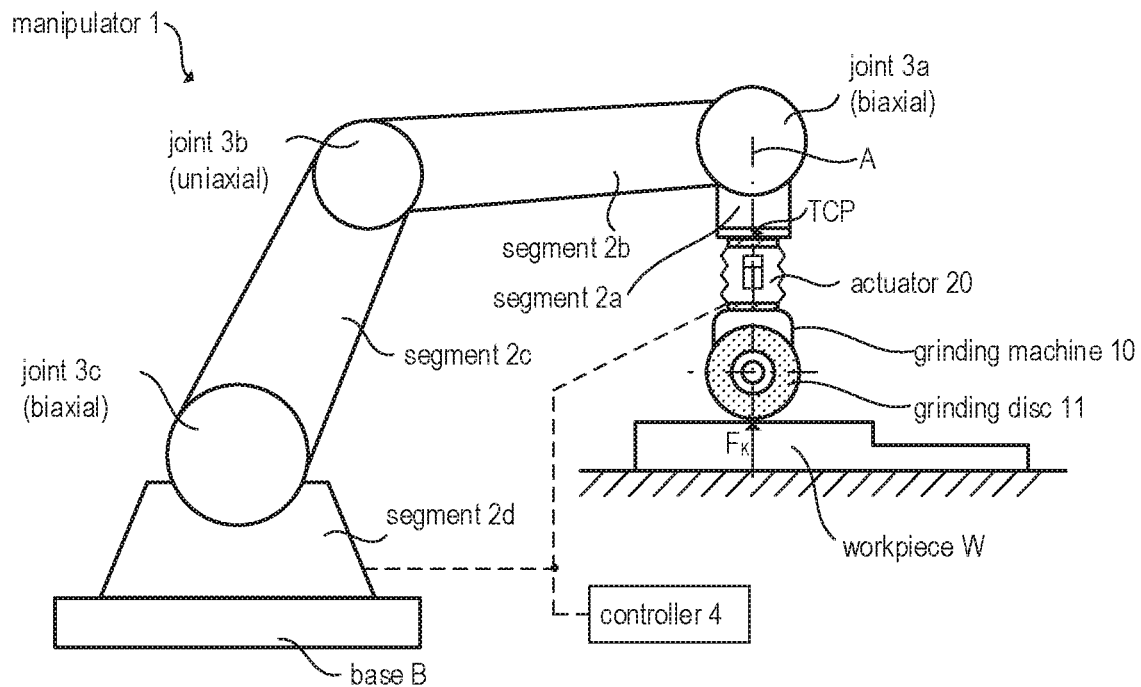
FIG. 1 is an exemplary illustration of a robot-supported grinding device with a grinding machine that is coupled to an industrial robot by means of a force-regulated linear actuator.

The example illustrated in FIG. 1 comprises a manipulator 1 (for example, an industrial robot) and a grinding machine 10 with a rotating grinding tool (grinding disc), wherein the grinding machine 10 may be coupled to the tool center point (TCP) of the manipulator 1 via a linear actuator 20 (which, however, need not necessarily be the case in all of the embodiments). In the case of an industrial robot with 6 degrees of freedom, the manipulator can be constructed of 4 segments 2a, 2b, 2c and 2d, each of which is connected via joints 3a, 3b and 3c. The first segment is generally rigidly connected to a base B (which, however, need not necessarily be the case). The joint 3c connects the segments 2c and 2d. The joint 3c may be biaxial and allow for a rotation of the segment 2c around a horizontal axis of rotation (elevation angle) and around a vertical axis of rotation (Azimuth angle). The joint 3b connects the segments 2b and 2c and allows for a pivoting movement of the segment 2b relative to the position of segment 2c. The joint 3a connects the segments 2a and 2b. The joint 3a may also be biaxial, and thereby (similar to the joint 3c) allow for a pivoting movement in two directions. The TCP is at a fixed position relative to segment 2a, which generally also comprises a pivot joint (not illustrated) that allows for a rotational movement around a longitudinal axis A of the segment 2a (designated in FIG. 1 with a dash-dotted line). An actuator is designated for the axis of each joint which can effect a rotational movement around the respective joint axis. The actuators in the joints are controlled by a robot controller 4 in accordance with a robot program. The TCP can be positioned (within certain limits) wherever desired (and with any desired orientation of the axis A).

The manipulator 1 is generally position-controlled, i.e. the robot controller can determine the pose (position and orientation) of the TCP and can move it along a previously defined trajectory. When the actuator 20 comes to rest against an end stop, the pose of the TCP also defines the pose of the grinding tool. The actuator 20 can be used to adjust the contact force (machining force) between the tool (grinding disc 11) and the work piece W to a desired value. Controlling the machining force directly by means of the manipulator 1 may be difficult or undesirable in many cases as the high mass inertia of the segments 2a-2c of the manipulator 1 makes reliable control difficult. For this reason, the robot controller can be configured to only adjust the pose (position and orientation) of the TCP, while the adjustment of the contact force (see also FIG. 2, contact force $F_K$) can be exclusively left to the actuator 20 that is coupled between the grinding machine 10 and the manipulator 1. As previously mentioned, the actuator 20 is not always needed and can be omitted from some applications. In some applications the actuator can be replaced with a simple spring.

In the present example the actuator 20 is a pneumatic actuator, e.g. a double-acting pneumatic cylinder. Other pneumatic actuators, however, may also be used such as, e.g. bellows cylinders or air muscles. Direct (gearless) electric drives may also be considered as an alternative. When a pneumatic actuator is used, the force can be adjusted in a commonly known manner with the aid of a control valve, a controller (implemented in the robot controller 4) and a compressed air reservoir. The specific implementation, however, is of no relevance for the further description and will not be discussed in detail here.

Figure 2:
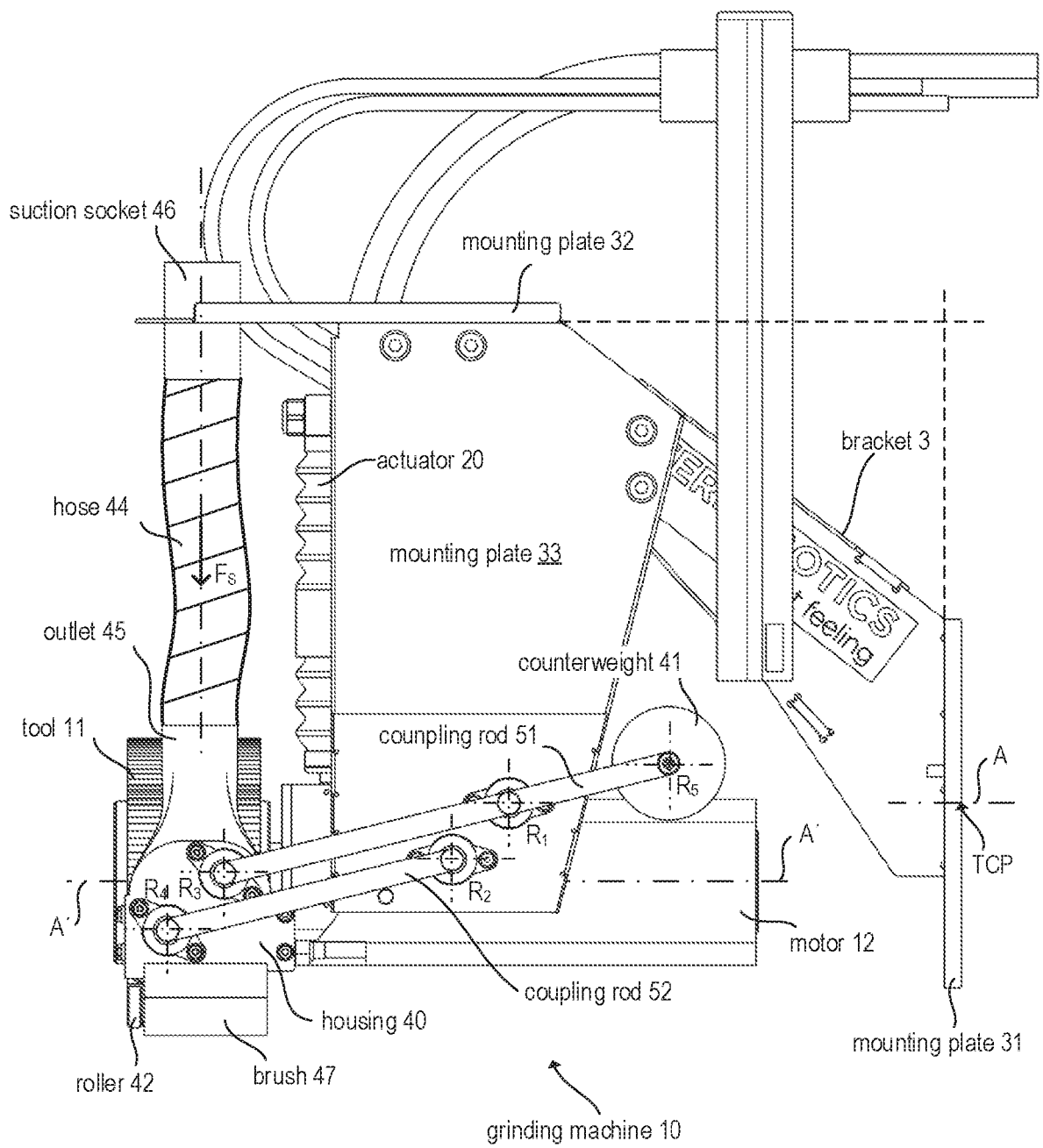
FIG. 2 is a lateral view of a grinding device with an extraction device and which is mounted on a manipulator.
Figure 3:
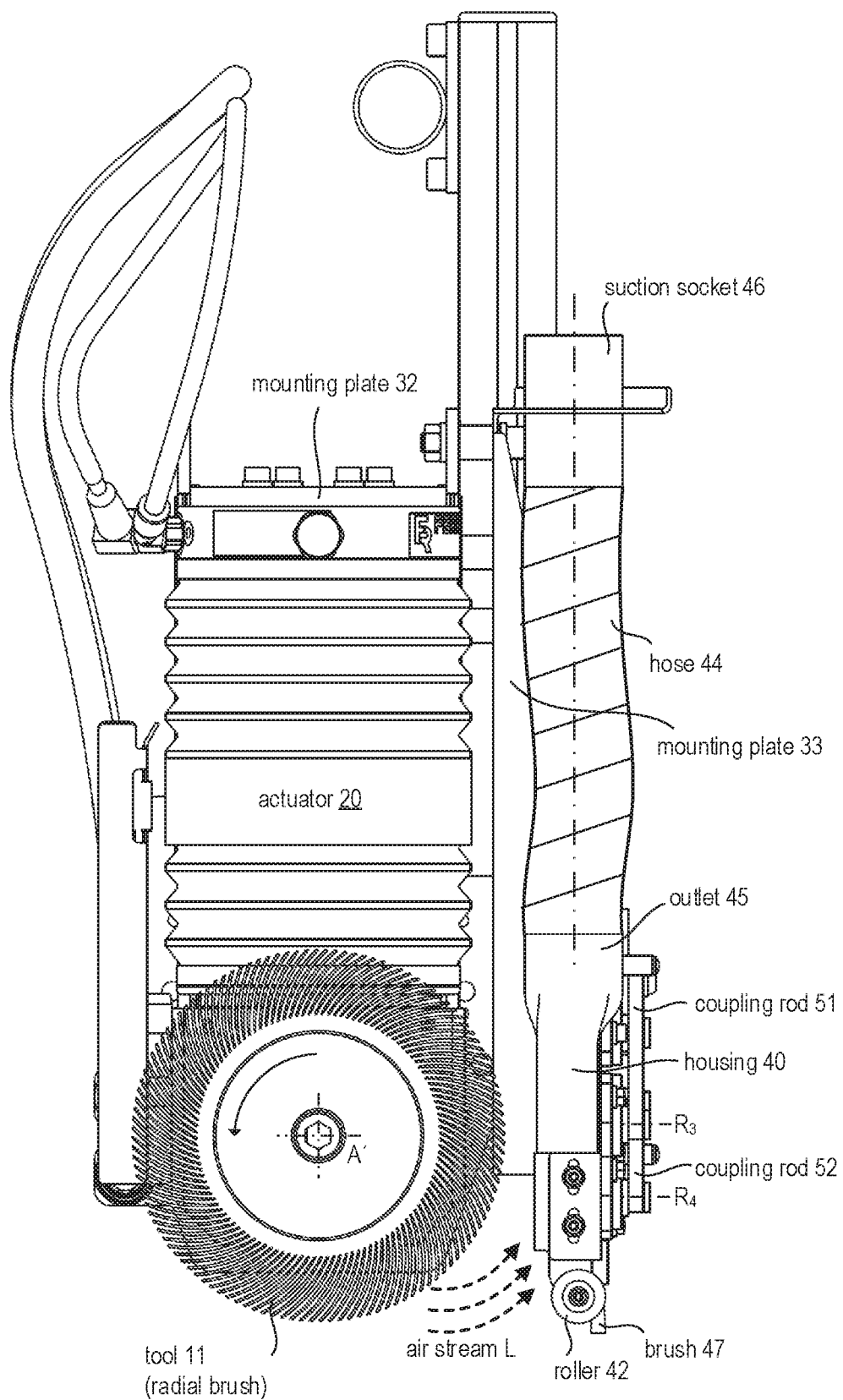
FIG. 3 is a front view belonging to the lateral view of FIG. 2

FIG. 2 shows a lateral view of an exemplary embodiment of a grinding machine 10 with an extraction device mounted on a manipulator. FIG. 3 shows a view of the same from the front. As in the example of FIG. 1, the grinding machine 10 is coupled to the manipulator via a linear actuator 20. As opposed to the example of FIG. 1, however, the effective direction of the actuator 20 is not parallel to the longitudinal axis A of segment 2a of the manipulator (shown on the right side of FIG. 2, cf. also FIG. 1), but rather at a right angle. A bracket 3 (mounting bracket) is provided to couple the actuator 20 and the grinding machine 10 onto the manipulator 1, the bracket comprising a first mounting plate 31 (flange) and a second mounting plate 32, both arranged at a tight angle to each other. The mounting plate 31 is designed to be mounted on the manipulator. In this example, the TCP of the manipulator lies on a surface of the mounting plate 32 on the axis A A first end of the actuator 20 is connected to the mounting plate 32 (e.g, by means of screws) and the grinding machine 10 is connected to a second end of the actuator 20 (e.g. also by means of screws). In the example illustrated here, the axis of rotation A' of the motor shaft of the motor 12 of the grinding machine 10 extends at a right angle to the effective direction of the actuator 20 and parallel to the longitudinal axis A of the distal segment of the robot. The deflection of the actuator 20 thus determines the standard distance between the axes A and A'. A rotating tool 11 is connected to the motor shaft of the motor 12 of the grinding machine 10. In the present example this is a radial bristle brush. Depending on the respective application, a different tool may also be used (e.g. a grinding disc, a grinding belt, etc.).

It should be noted that the axes A and A' do not necessarily need to be parallel. Nor do the mounting plates 31 and 32 necessarily need to be arranged at a tight angle. As can be seen from FIG. 2, the position of the grinding machine 10 depends only on the position (and orientation) of the TCP and on the deflection of the actuator 20. A controller (e.g. the robot controller) can determine—for any known angle and for any known distance between the mounting plates 31 and 32—the position (including orientation) of the axis of rotation A' of the motor shaft of the grinding machine 10 from the position of the TCP and of the deflection of the actuator 20. In embodiments without an actuator 20, the position of the motor shaft of the grinding machine can be determined from the position of the TCP by means of a simple coordinate transformation.

Figure 4:
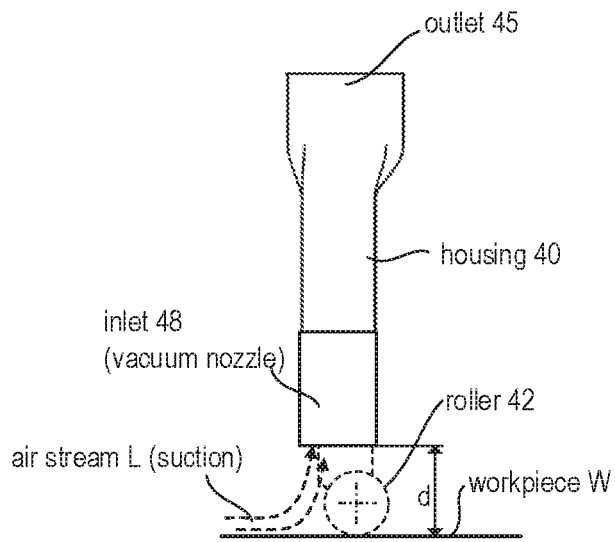
FIG. 4 is a detailed view of a part of the extraction device from FIGS. 2 and 3.

The extraction device is mounted on a support, in the present example implemented as the bracket 3. The aforementioned mounting plates may be (e.g. an integral) part of the support. In the example shown here, the bracket 3 has a further mounting plate 33 on which the extraction device is mounted. The extraction device includes a comparatively small housing 40, which may be formed similar to a crevice nozzle of a vacuum cleaner. In other words, at the lower end of the housing a vacuum nozzle 48 is arranged through which dust and other particles can be extracted. A detailed view of the housing 40 is also shown in FIG. 4. In addition to the nozzle at the lower end of the housing 40, a roller 42 can also be mounted on the housing 40. The roller 42 can be designed to roll over the surface of the work piece W during the machining and thereby maintain a predefined distance d of the housing 40 to the work piece W. A brush 47 may be disposed on one side of the housing to provide an additional cleaning of the machined work piece surface. The roller 42 and the brush 47, however, are optional and can be omitted depending on the specific application. The housing 40 has an outlet 45 at the end opposite the vacuum nozzle (on the top side) through which the extracted material is removed. In addition, a hose 44 is connected to the outlet 45 which may also be attached to the bracket (e.g. on the mounting plate 32). The hose 44 extends from the housing 40 to the suction side of a blower (not shown). Suitable blowers are generally well known and will therefore not be discussed here further.

In FIG. 2, the suspension of the housing 40 on the bracket 3 can be seen. Here the housing 40 of the extraction device is mounted on the mounting plate 33 by means of a coupling quadrilateral (the German word "Koppelviereck" translates literally to coupling ("Koppel-") quadrilateral ("-viereck") and also means coupling quadrangle or coupling tetragon, e.g. a four-bar coupling). The coupling quadrilateral is mainly formed by the coupling rods 51 and 52, which are pivotably mounted on the mounting plate 33 (axes of rotation $R_1$ and $R_2$). One end of each of the coupling rods 51 and 52 is also pivotably mounted on the housing 40 (axes of rotation $R_3$ and $R_4$), whereas, in the present example, the axes of rotation $R_1$, $R_2$, $R_3$ and $R_4$ are arranged such that the coupling rods 51 and 52 extend essentially parallel. One of the coupling rods (in the present example the coupling rod 52) is attached to a counterweight 41 (the center of gravity of the counterweight is designated as $R_5$). This counterweight 41 is located on the side of the axis of rotation $R_1$ that lies opposite the housing 40 and is dimensioned to off balance the weight force of the housing 40. This means that, in absence of an outside force that affects the coupling quadrilateral, substantially no torque forces are exerted on the coupling rods 51 and 52. The coupling quadrilateral is balanced in every position, even when the grinding device is used upside-down. In other words, the torque force exerted by the weight force of the grinding device (without the hose 44) on the coupling quadrilateral (e.g. around the axis of rotation R1) is mostly compensated by the torque force exerted by the weight force of the counterweight on the coupling quadrilateral.

Figure 5:
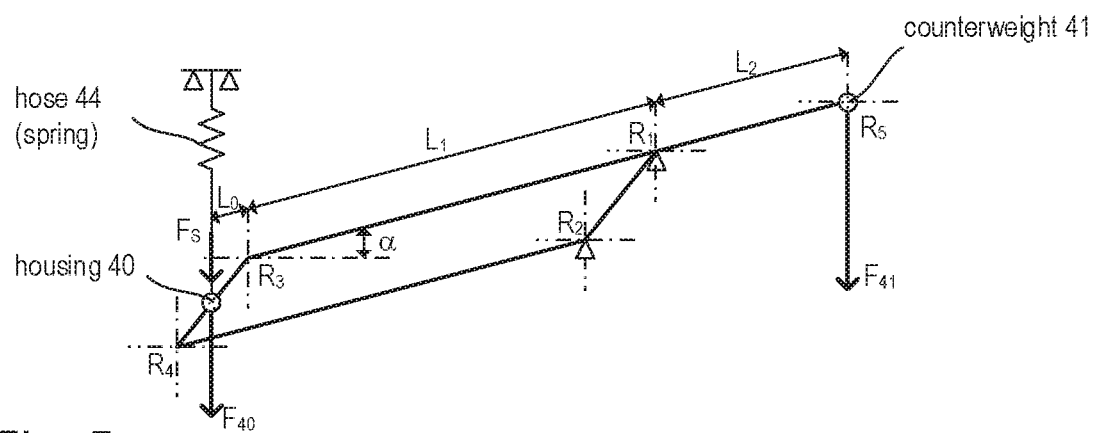
FIG. 5 schematically illustrates an example of a counter-balanced suspension for the extraction device.

The forces exerted on the coupling quadrilateral are once again illustrated in FIG. 5, wherein it is assumed, without loss of generality, that the mass of the housing 40 and of the counterweight 41 are each concentrated on one point (point of gravity) and the masses of the coupling rods are added to the masses of the housing and of the counterweight. The torque force produced around the axis $R_1$ by the weight force $F_{40}$ of the housing 40 is $F_{40} \cdot (L_0+L_1) \cdot \cos(\alpha)$, and the torque force produced around the axis $R_1$ by the weight force $F_{41}$ of the counterweight 41 is $-F_{41} \cdot L_2 \cdot \cos(\alpha)$, wherein $L_0$ is the distance between axis $R_3$ and the point of gravity at which the force $F_{40}$ is exerted. $L_1$ is the distance between the axes $R_1$ and $R_2$ and $L_2$ is the distance between the axis $R_1$ and the point of gravity of the counterweight 41. Thus, the coupling quadrilateral is balanced when $F_{40} \cdot (L_0+L_1) \cdot \cos(\alpha) - F_{41} \cdot L_2 \cdot \cos(\alpha) = 0$. It is evident that the angle $\alpha$ plays no role in this equation, which results in $F_{41} = F_{40} \cdot (L_0+L_1)/L_2$.

Very little force is needed to press the housing 40, e.g. with the roller 42, against the surface of the work piece and it is effective (as opposed to the forces of the weights) in any position in the direction of the work piece surface. This small force can be generated, e.g. by a spring element that acts directly or indirectly between the bracket 3 (e.g. the mounting plate 33) and the coupling quadrilateral. In the example illustrated in FIG. 2, this elastic force FS is generated by the hose 44 that is connected to the outlet 45 of the housing 40 and attached to the mounting plate 32 of the bracket 3. The elastic force generated by the hose 44 thus takes effect between the mounting plate 32 and the housing 40 and thus, indirectly, between the mounting plate 32 (i.e. the bracket 3) and the coupling quadrilateral, as well. This situation is illustrated in FIG. 5. The center bearing points, symbolized as triangles, are all rigidly connected to the bracket 3 (i.e. they lie on one of the mounting plates 32 or 33).

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. An extraction device, comprising:
   a housing with a vacuum nozzle and an outlet configured to connect to a hose;
   a suspension with a coupling quadrilateral that connects the housing to a mounting plate and that is pivotably mounted on the mounting plate around a first axis;
   a counterweight that is connected to the suspension such that the weight of the housing and of the counterweight are balanced with respect to the first axis; and
   a spring element coupled to the housing or the suspension, the spring element being configured to directly or indirectly apply an elastic force between the mounting plate and the housing,
   wherein the housing comprises a roller configured to contact a surface of a workpiece during operation,
   wherein the spring element presses the roller against the surface of the workpiece.

2. The extraction device of claim 1, wherein the coupling quadrilateral connects the housing and the mounting plate.

3. The extraction device of claim 1, wherein the coupling quadrilateral comprises a first coupling rod that is pivotably mounted on the mounting plate around the first axis.

4. The extraction device of claim 3, wherein the suspension has a second coupling rod that is pivotably mounted on the mounting plate around a second axis, and wherein the first coupling rod and the second coupling rod are pivotably mounted on the housing to form the coupling quadrilateral.

5. The extraction device of claim 3, wherein the counterweight is attached to the first coupling rod of the coupling quadrilateral.

6. The extraction device of claim 1, wherein the spring element is the hose.

7. The extraction device of claim 6, wherein the hose is attached to the mounting plate.

8. The extraction device of claim 1, further comprising:
   a brush disposed on the housing and configured to contact the surface of the workpiece during operation.

9. An extraction device, comprising:
   a housing with a vacuum nozzle and an outlet configured to connect to a hose;
   a suspension with a coupling quadrilateral that connects the housing to a mounting plate and which is pivotably mounted on the mounting plate around a first axis;
   a counterweight that is connected to the suspension such that the weight of the housing effects a first torque around the first axis and the counterweight effects a second torque around the first axis which at least partially compensates the first torque; and
   a spring element coupled to the housing or the suspension, the spring element being configured to directly or indirectly apply an elastic force between the mounting plate and the housing,
   wherein the housing comprises a roller configured to contact a surface of a workpiece during operation,
   wherein the spring element presses the roller against the surface of the workpiece.

10. The extraction device of claim 9, wherein the coupling quadrilateral connects the housing and the mounting plate.

11. The extraction device of claim 9, wherein the coupling quadrilateral comprises a first coupling rod that is pivotably mounted on the mounting plate around the first axis.

12. The extraction device of claim 11, wherein the suspension has a second coupling rod that is pivotably mounted on the mounting plate around a second axis, and wherein the first coupling rod and the second coupling rod are pivotably mounted on the housing to form the coupling quadrilateral.

13. The extraction device of claim 11, wherein the counterweight is attached to the first coupling rod of the coupling quadrilateral.

14. The extraction device of claim 9, wherein the spring element is the hose.

15. The extraction device of claim 14, wherein the hose is attached to the mounting plate.

16. The extraction device of claim 9, further comprising:
a brush disposed on the housing and configured to contact a workpiece surface during operation.

17. A device for machining of a surface of a workpiece, the device comprising:
a bracket configured to be mounted on a manipulator;
a machine tool with a rotating tool and which is mechanically coupled to the bracket; and
an extraction device comprising:
a housing with a vacuum nozzle and an outlet configured to connect to a hose;
a suspension with a coupling quadrilateral that connects the housing to a mounting plate, which is a part of the bracket and which is pivotably mounted on the mounting plate around a first axis;
a counterweight that is connected to the suspension such that the weight of the housing effects a first torque around the first axis and the counterweight effects a second torque around the first axis which at least partially compensates the first torque; and
a spring element coupled to the housing or the suspension, the spring element being configured to directly or indirectly apply an elastic force between the mounting plate and the housing,
wherein the housing comprises a roller configured to contact a surface of a workpiece during operation,
wherein the spring element presses the roller against the surface of the workpiece.

18. The device of claim 17, wherein the housing is disposed, with respect to an advance direction of the machine tool, in front of or behind the rotating tool.

19. The device of claim 17, wherein the rotating tool is a grinding disc.

20. The device of claim 17, further comprising:
a linear actuator that couples the machine tool to the bracket and that is configured to move the machine tool relative to the bracket.

21. The device of claim 17, wherein the extraction device further comprises a brush disposed on the housing and configured to contact the surface of the workpiece during operation.

22. The device of claim 18, wherein the spring element is the hose.

23. The device of claim 19, wherein the hose is attached to the mounting plate.

* * * * *